United States Patent [19]

Ikeda

[11] 4,026,720

[45] May 31, 1977

[54] COATING COMPOSITION FOR ACRYLICS

[75] Inventor: Tadayoshi Ikeda, Amagasaki, Japan

[73] Assignee: Daicel, Ltd., Osaka, Japan

[22] Filed: May 8, 1975

[21] Appl. No.: 575,600

[30] Foreign Application Priority Data

May 10, 1974 Japan .............................. 49-51910

[52] U.S. Cl. .................... 106/287 SB; 260/31.2 R;
260/32.8 SB; 260/33.2 SB; 260/33.4 SB;
260/33.6 SB; 260/46.5 Y; 260/46.5 UA
[51] Int. Cl.² ..................... C08K 5/09; C08L 83/06
[58] Field of Search ............. 260/31.2 R, 33.4 SB,
260/33.2 SB, 32.8 SB, 33.6 SB, 46.5 UA, 4.5
Y; 106/287 SB

[56] References Cited

UNITED STATES PATENTS

| 3,476,827 | 11/1969 | Engelhardt | 260/31.2 R |
| 3,894,881 | 7/1975 | Suzuki et al. | 106/287 SB |

*Primary Examiner*—Allan Lieberman
*Attorney, Agent, or Firm*—Woodhams, Blanchard and Flynn

[57] ABSTRACT

A coating composition comprises (1) a partially hydrolyzed siloxane compound, (2) one or more of alkali metal and zinc salts of naphthenic acid, (3) acetic acid, and (4) other organic solvents. This composition contains these components in appropriate proportions. The composition is coated on the surface of an acrylic resin object and is cured. The coated acrylic object possesses excellent properties such as surface hardness, mar resistance, solvent resistance and stress-crazing resistance.

5 Claims, No Drawings

COATING COMPOSITION FOR ACRYLICS

BACKGROUND OF THE INVENTION

1. Field of the Invention

This invention relates to a composition which, when coated on the surface of an acrylic resin object, forms a protective layer which is superior to other layers coated on plastics, in general, in surface hardness, and in mar, solvent and stress-crazing resistance.

2. Description of the Prior Art

Generally, because plastics are not high in surface hardness, and in mar or scratch resistance, they are apt to be easily injured to lose their gloss. These defects are serious when the plastics are used for making optical products, such as lenses.

In order to improve these inferior properties, there have previously been proposed many methods of coating organic siloxane compounds on the surface of a plastic object and curing the coating to form a protective layer on the plastic object. The prior methods, however, are not effective to provide a completely satisfactory protective layer.

For instance, a protective layer or a coating made by the prior methods is so brittle that when an attempt is made to improve its abrasion resistance, it tends to crack easily. On the other hand, when an attempt is made to improve its craze resistance, it tends to become lower in its abrasion resistance. Further, prior art coating solutions have too short a pot life to be useful for a long time.

SUMMARY OF THE INVENTION

The object of this invention is to provide a coating composition which can form, on the surface of an acrylic resin object, a protective layer excellent in surface hardness, mar and solvent resistance and stress-crazing resistance.

I have intensely studied how to improve the defective properties inherent in the layers coated on plastics in general and accomplished, as described later in detail, a coating composition having a long pot-life. The new coating composition can be applied on the surface of an acrylic resin object and cured to form a coating layer which is greatly improved in the properties mentioned earlier.

The coating composition or solution I have invented can be applied directly onto the surface of an acrylic resin object by any of the coating methods commonly in use, and cured at a temperature of from about 80° C to about 100° C to evaporate the solvents contained in it and to further react by condensation.

The coating composition, according to the invention, comprises (1) a partially hydrolyzed siloxane compound or product of hydrocarbon trialkoxy silanes having the formula R'Si(OR")$_3$, (2) one or more of alkali metal and zinc salts of naphthenic acid, (3) acetic acid, and (4) one or more organic solvents which are compatible with the Components (1) and (2).

The hydrocarbon trialkoxy silanes (1) are multifunctional siloxane compounds having the formula R'Si(OR")$_3$, wherein R' is selected from the group consisting of alkyls having one to 4 carbon atoms, phenyl, vinyl, and other functional groups, and R" is alkyl having one to 4 carbon atoms. Methyl triethyoxy silane is preferred.

A partially hydrolyzed product of hydrocarbon trialkoxy silanes is obtained, as described in U.S. Pat. No. 3,451,838, by adding water to hydrocarbon trialkoxy silanes and heating the resulting material at a temperature of 50° to 80° C for one to ten hours.

In my invention, the hydrocarbon trialkoxy silane can be mixed with from 1 to 40 weight percent of one or more of organosilane compounds such as phenyl or vinyl trialkoxy ($C_1$ to $C_4$) silanes, and to this mixture, either water or mineral acids such as hydrochloric acid, is added and heated to produce a partially hydrolyzed co-condensation product.

A partially hydrolyzed co-condensation product which consists essentially of one mole of said hydrocarbon trialkoxy silane as a major component and from 0.05 to 1 mole of tetraalkoxy ($C_1$ to $C_4$) silane as an additional component can form a coating with increased hardness.

A partially hydrolyzed co-condensation product of one mole of said hydrocarbon trialkoxy silane and from 0.05 to 1 mole of dialkyl ($C_1$ to $C_4$) dialkoxy ($C_1$ to $C_4$) silane can give a soft coating.

Further, when a hydrocarbon trialkoxy silane wherein R' is a vinyl group is used as a component of the co-condensation product, the silane can increase the adhesion of the resulting layer to acrylic surfaces.

Thus, by properly selecting the components used in the co-condensation product, I can obtain the resulting coating which possesses desirable properties.

The foregoing partially hydrolyzed products may contain less than about 5 percent by weight of water based on the total weight of the hydrolyzed products.

The solid concentration of the partially hydrolyzed co-condensation product determines the coating weight of the protective layer formed on the surface of acrylics. The coating weight in turn determines the physical properties of the layer.

A higher solid concentration provides a heavier coating weight of the layer which is excellent in hardness as well as in mar resistance, but is so brittle as to craze readily when bent.

On the other hand, a lower solid concentration provides a lighter coating weight of the layer which is too low in mar resistance to give a product suitable for practical use.

The suitable coating weight of the composition of the invention varies depending on the acrylic resin object on which the composition is coated. An amount of 2 to 6 grams per square meter, expressed in terms of solid, coated on the acrylic resin object, is most desirable for application to acrylic sunglass lenses.

To obtain a layer coated in the foregoing amount (2 to 6 grams/square meter), it is preferable to dip the acrylic object into the coating solution and then remove the object from the coating solution at a rate of 10 to 40 centimeters per minute to form the coating layer on the object. The coating solution has a viscosity of 10 to 30 centipoises and contains in it 10 to 40 percent by weight, calculated as the solids, of the partially hydrolyzed product.

The properties of the coated layer can vary greatly depending on the type of catalyst or catalysts used in the coating composition.

I have discovered that the use of metal salts of naphthenic acid, as catalysts, gives a coating composition which possesses a longer pot-life than the conventional coating compositions. I have further discovered that such coating composition then confers a favorable balance of the somewhat conflicting properties of mar resistance and stress-crazing resistance, on the coated layer.

The term naphthenic acid, as employed in this specification and claims, means the generic designation of monocarboxylic acids of naphthene hydrocarbons, present in crude mineral oils, which acids have the formula of $R'''(CH_2)_n COOH$, wherein $R'''$ is a cyclic nucleus composed of one or more of rings, i.e., cyclohexane ring, cyclopentane ring and their alkylated cyclic nuclei in general, wherein $n$ is an integer of one to 14.

The carboxylic acid group combines with the ring nucleus ($R'''$) through methylene ($—CH_2—)_n$ groups. The simplest and typical acid, when $n = 1$, is cyclopentane acetic acid.

Naphthenic acid is a mixture of inseparable organic acids having from 7 to 20 carbon atoms and a cyclic nucleus. Accordingly, the naphthenic acid is used as a mixture of substances having the formula given above.

Acceptable metal salts of naphthenic acid are alkali metal and zinc salts, one or a mixture of which is used in the coating composition of this invention. Other metal salts will not confer a satisfactory catalytic effect on the coating composition.

The metal salts of naphthenic acid employed in this invention are used in an amount of 0.05 to 5 percent by weight, based on the weight of said partially hydrolyzed hydrocarbon trialkoxy silane product or co-condensation product. When the salts are used in an amount below 0.05 part by weight, they are ineffective in causing a satisfactory cure reaction in the coating composition.

Conversely, when the salts are used in an amount of above 5 percent, they ooze out from the inside of, onto the surface of, the coated layer.

The catalysts confer on the coating composition a mild cure reaction, a property which then results in excellent hardness and mar resistance as well as outstanding adhesion and stress-crazing resistance of the coated layer. The catalysts also confer remarkably stabilized properties on the coating composition solution.

In addition, the catalysts dissolve very well in the solvents for partially hydrolyzed products of hydrocarbon alkoxy silanes and co-condensation products thereof.

It is also critical to incorporate acetic acid in the coating composition, according to this invention.

The acetic acid must be added in an amount of 5 to 30 percent by weight, based on the total weight of the coating composition. The acetic acid acts as a solvent and also causes the coating layer firmly to adhere to the surface of the acrylic resin object.

The acetic acid is also effective to maintain the pot life of the coating solution for a long time and also prevents the coated solution from exhibiting any blushing phenomenon.

The acetic acid prevents the acrylics from solvent-crazing which otherwise readily occurs when acrylics come into contact with alcohols.

Further, if the acetic acid is added in an amount in excess of 30 percent, a part of it remains after the composition has been cured under normal conditions, causing an unpleasant odor. Conversely, when it is used in an amount less than 5 percent, the resulting layer has insufficient adhesion.

Glacial acetic acid is preferred, but acetic acid of commercial grade can also be used.

The other organic solvents that are used, in addition to acetic acid, are not critical and they can be selected from conventional solvents for the partially hydrolyzed siloxane compound and naphthenic acid salts, such as alcohols, ketones, ethers, and aromatic hydrocarbons. Of these solvents, ethanol and isopropyl alcohol are particularly preferable in terms of boiling point, and solubility, in making a composition for the coating of acrylics. The amount of the other organic solvent is sufficient to completely dissolve the partially hydrolyzed compound and the naphthenic acid salt, in combination with the acetic acid, and to adjust the concentration of said partially hydrolyzed compound to 10 to 40 percent by weight, calculated as the solids, based on the total weight of the coating composition.

For coating the composition, according to the invention, on acrylics, any conventional processes such as dipping, spray and flow coating, and the like can be employed. The thus-coated acrylics are then heated to cure the siloxane resin (partially hydrolyzed compound). This curing can be carried out at a temperature much lower than those which are customary in the prior art.

However, because the higher the curing temperature, the shorter is the curing time, it is preferred to cure the coated layer at a temperature as high as possible, but lower than the heat-distortion temperature of the acrylics. Curing at 80° C to 100° C for 2 to 40 hours is preferred.

This invention is further described by reference to the following illustrative Examples and Comparative Examples.

EXAMPLES 1 TO 4

Water was added to a solution of methyl triethoxy silane in ethanol. The mixture was heated at 75° C for 3 hours and was further heated at 145° C to distill out the azeotropic mixture of alcohol and water to give a partially hydrolyzed condensate solution, which contained in it about 50 percent by weight of partially hydrolyzed siloxane compound, identified as Component (a) in the following Table 1. The solution then was diluted with n-butanol.

Sodium naphthenate, identified as Component (b) in Table 1, was dissolved in a part of the glacial acetic acid, identified as Component (c), the total quantity of which was pre-calculated as shown in Table 1. The solution of Components (b) and (c) was then added into the foregoing partially hydrolyzed condensate/n-butanol solution.

The resulting solution was further adjusted, by addition of n-butanol as needed, so that it contained the three Components (a), (b) and (c) in the quantities shown in Table 1, to obtain coating solutions.

Injection molded optical lenses of methyl methacrylate resin were thoroughly rinsed by a degreasing agent and by cleaning liquids, and then they were immersed in the foregoing coating solutions and taken out at a rate of 30 cm per minute. The coated lenses were then put into an oven at 95° C and allowed to remain therein for 16 hours for curing the coating layer.

The coated lenses thus obtained were tested for adhesion, pencil hardness, mar resistance (steel wool abrasion), and stress-crazing resistance. In addition, the coating solutions were evaluated for pot life by an accelerated pot life test. The results obtained are indicated in Table 1.

The physical properties of the coated lenses shown in Table 1 were determined as follows:

1. Adhesion

The coated layer of each of the lenses was cut by a sharp blade to crosshatch ten horizontal and ten vertical lines on it at intervals of 1 mm between the lines.

A cellophane adhesive tape was then firmly stuck onto the crosshatched lines of the lens and was sharply pulled away at a 90° angle to the coated layer. This procedure was repeated three times. The adhesion thus obtained was rated in five classes from A (no delamination) to E (complete delamination), depending on the extent to which the layer was delaminated.

2. Pencil Hardness

A pencil hardness tester which evaluate the hardness of paints, varnishes, and the like, was used to measure the hardness of the coated layer. A pencil core held on the coated surface of a sample lense at a 45° angle to the surface was moved about 3mm forward under a load of 1.0 ± 0.05 kg and at a speed of 0.05 mm per second. The test results are given in terms of the minimum hardness of the pencil core that caused injury to the coated layer under these conditions.

3. Mar Resistance (Steel Wool Abrasion Test)

The coated surface of the lens was rubbed with a steel-wool pad. The results are indicated by the following three categories, depending on the extent to which the surface was scratched:

A = Free of scratches even when the surface was rubbed hard with the steel-wool pad.
B = Slightly scratched when the surface was rubbed with the steel-wool pad.
C = Easily scratched when the surface was rubbed gently with the steel-wool pad.

4. Stress-Crazing Resistance

A lens specimen of 80 mm in diameter was set between a jaw and a compression load cell of an INSTRON Testing Machine. The specimen was continuously compressed at a speed of 20 mm per minute until its surface began to craze, at which time the stress and the strain applied were recorded. Its stress-crazing resistance was rated as follows:

Excellent (A) = No crazing even when the strain exceeded 12.5 percent.
Good (B) = No crazing when the strain is from 5 to 12.5 percent.
Inferior (C) = Crazing when the strain is below 5 percent.

5. Pot Life

A coating composition was put into a test tube, which was then stoppered, and allowed to stand in a hot water bath at 50° C. The coating composition in the tube was observed at timed intervals, in terms of its turbidity, whitening, consistency, gelation, and the like. In Table 1, the pot life is shown by the number of hours during which the composition did not gel.

COMPARATIVE EXAMPLES 1 to 6

Coating compositions were prepared as described above but the amounts of Components (b) and (c) were adjusted as indicated in Table 1. In Comparative Example 6 sodium acetate was used instead of Component (b). These comparative coating compositions were coated on the surfaces of the lenses as in Examples 1 to 4 above, cured in the same manner and the same properties were evaluated. The test results are shown in Table 1.

Table 1

| | Coating Composition | | | | Test Results | | | | |
|---|---|---|---|---|---|---|---|---|---|
| | Component (a) (Solid Concentration (%)) | Component (b) (Parts by weight to 100 parts of Component (a)) | Component (c) (Concentration (% on the total basis)) | Sodium Acetate (Parts by weight to 100 parts of Component (a)) | Adhesion | Pencil Hardness | Mar Resistance | Stress Crazing Resistance | Pot Life (Accelerated Test) | Remark |
| Examples | | | | | | | | | | |
| 1 | 15 | 2.5 | 15 | — | A | 5H | A | A | — | |
| 2 | 30 | 0.2 | 21 | — | A | 6H | A | A | 72 | |
| 3 | 35 | 1.4 | 21 | — | A | 7H | A | A | 72 | |
| 4 | 35 | 5.0 | 21 | — | A | 7H | A | A | — | |
| Comparative Examples | | | | | | | | | | |
| 1 | 30 | — | — | — | E | 2B | C | C | — | |
| 2 | 30 | 1.7 | — | — | D | 2B | B | B | — | |
| 3 | 30 | — | 18 | — | B | H | C | C | — | |
| 4 | 30 | 1.7 | 3 | — | C | 4H–5H | B | B | — | |
| 5 | 30 | 2.5 | 35 | — | A | 5H–6H | A | A | — | Slightly vinegar odor |
| 6 | 30 | — | 18 | 1.7 | A | 7H | A | A | 48 | |

Component (a) = partially hydrolyzed methyl triethoxy silane condensate solution
Component (b) = sodium naphthenate
Component (c) = acetic acid The embodiments of the invention in which an exclusive property or privilege is claimed are defined as follows:

1. A coating solution, consisting essentially of
  a. from 10 to 40 percent by weight, based on the total weight of the coating composition, of a partially hydrolyzed siloxane substance obtained by hydrolyzing in water, at 50° to 80° C, for one to 10 hours, a substance selected from the group consisting of 1. a hydrocarbon trialkoxy silane having the formula R'Si(OR")$_3$, wherein R' is selected from the group consisting of alkyl having one to 4 carbon atoms, phenyl and vinyl, and R" is alkyl having one to 4 carbon atoms, and
2. co-condensation products of (1) and from 1 to 40 weight percent of phenyl or vinyl trialkoxy silane wherein alkoxy has one to 4 carbon atoms, b. from 0.05 to 5 percent by weight, based on the weight of component (a), of one or a mixture of salts selected from the group consisting of alkali metal salts of naphthenic acid and zinc salts of naphthenic acid, c. from 5 to 30 percent by weight, based on the total weight of the coating composition, of acetic acid, and d. the balance is one or a mixture of inert organic solvents for components (a) and (b), said inert solvent or solvents being present in an amount sufficient, in combination with component (c), to completely dissolve components (a) and (b).

2. A coating composition as set forth in claim 1, wherein said solvents (d) are alcohols, ketones, ether, or aromatic hydrocarbons.

3. A coating composition as set forth in claim 1 having a viscosity of 10 to 30 centipoises.

4. A coating composition as set forth in claim 1 in which Component (a) is methyl triethoxy silane and Component (b) is sodium naphthenate.

5. A coating composition as set forth in claim 1 wherein component (a) consists of (1) and component (b) consists of one or a mixture of alkali metal salts of naphthenic acid.

* * * * *